(12) United States Patent
Cmielowski et al.

(10) Patent No.: US 10,565,096 B2
(45) Date of Patent: Feb. 18, 2020

(54) GENERATION OF TEST SCENARIOS BASED ON RISK ANALYSIS

(71) Applicant: International Business Machines Corporation, Armonk, NY (US)

(72) Inventors: Lukasz G. Cmielowski, Cracow (PL); Marcin Filip, Cracow (PL); Mateusz S. Matejczyk, Tarnowskie Gory (PL); Andrzej J. Wrobel, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 15/948,466

(22) Filed: Apr. 9, 2018

(65) Prior Publication Data

US 2018/0232300 A1  Aug. 16, 2018

Related U.S. Application Data

(63) Continuation of application No. 14/723,663, filed on May 28, 2015, now Pat. No. 9,971,677.

(51) Int. Cl.
G06F 11/36 (2006.01)

(52) U.S. Cl.
CPC ...... *G06F 11/3684* (2013.01); *G06F 11/3688* (2013.01)

(58) Field of Classification Search
CPC .................................................. G06F 11/3688
USPC ....................................................... 717/124
See application file for complete search history.

(56) References Cited

U.S. PATENT DOCUMENTS

| | | |
|---|---|---|
| 7,197,427 B2 | 3/2007 | Noonan et al. |
| 7,506,312 B1 | 3/2009 | Girolami-Rose et al. |
| 7,747,987 B1 | 6/2010 | Akarte et al. |
| 7,865,888 B1 | 1/2011 | Qureshi et al. |
| 8,607,208 B1 | 12/2013 | Arnold et al. |
| 2007/0174023 A1 | 7/2007 | Bassin et al. |
| 2010/0287534 A1 | 11/2010 | Vangala et al. |
| 2011/0022541 A1 | 1/2011 | Miles et al. |
| 2011/0067005 A1 | 3/2011 | Bassin et al. |
| 2014/0033176 A1 | 1/2014 | Rama et al. |
| 2014/0325480 A1 | 10/2014 | Bhagavatula |
| 2014/0380277 A1 | 12/2014 | Bhagavatula |

(Continued)

OTHER PUBLICATIONS

Anonymous, "Automatic creation of test scenarios based on customer PMRs and internal defects", IP.com Prior Art Database Technical Disclosure, IP.com No. IPCOM000198391D, Aug. 6, 2010, pp. 1-2. http://ip.com/IPCOM/000198391.

(Continued)

*Primary Examiner* — Charles E Anya
*Assistant Examiner* — Timothy P Duncan
(74) *Attorney, Agent, or Firm* — Kelsey M. Skodje

(57) ABSTRACT

Embodiments include a method for generation of test scenarios based on risk analysis. The method includes receiving a first set of code test scenarios, the first set of code test scenarios configured to test one or more first code components, the first code components each including first code attributes. The method also includes determining a probability of finding defects in the first code components based on the first code attributes. The method also includes generating a second set of code test scenarios based on the determining the probability of finding defects in the first code components based on the first code attributes, where the second set of one or more test scenarios is configured to test one or more second code components based on the second code attributes.

18 Claims, 9 Drawing Sheets

(56) References Cited

U.S. PATENT DOCUMENTS

| | | |
|---|---|---|
| 2015/0067648 A1 | 3/2015 | Sivanesan et al. |
| 2015/0378874 A1 | 12/2015 | Prasad et al. |
| 2016/0004626 A1 | 1/2016 | Jain et al. |
| 2016/0004627 A1 | 1/2016 | Farchi et al. |
| 2016/0188449 A1 | 6/2016 | Machida |
| 2016/0350207 A1 | 12/2016 | Cmielowski et al. |

OTHER PUBLICATIONS

Anonymous, "A system and method to automatically generate test case for business process application", IP.com Prior Art Database Technical Disclosure, IP.com No. IPCOM000237542D, Jun. 23, 2014, pp. 1-45. http://ip.com/IPCOM/000237542.

Arafeen et al., "Test Case Prioritization Using Requirements-Based Clustering", 2013 IEEE Sixth International Conference on Software Testing, Verification and Validation (ICST), Mar. 2013, pp. 1-10. http://cs.ndsu.edu/~hdo/pdf_files/icst13.pdf.

"Determining the number of clusters in a data set," Wikipedia: The Free Encyclopedia, pp. 1-3. http://en.wikipedia.org/wiki/Determining_the_number_of_clusters_in_a_data_set#cite_ref-1.

Simons et al., "Regression Test Cases Prioritization Using Failure Pursuit Sampling," 10th International Conference on Intelligent Systems Design and Applications, 2010, pp. 923-928.

Leon et al., "A Comparison of Coverage-Based and Distribution-Based Techniques for Filtering and Prioritizing Test Cases," Proceedings of the 14th International Symposium on Software Reliability Engineering (ISSRE '03), Washington, DC, 2003, 12 pages.

List of IBM Patents or Patent Applications Treated as Related, Signed Apr. 9, 2018, 2 pages.

| CLUSTER 810 | COMPONENT 820 | SUBCOMPONENT 822 | IMPACT 824 |
|---|---|---|---|
| CSI 1 812 | Model 64.22 | Simplified 100.0 | Serviceability 100.0 |
| CSI 2 814 | Database Migration 32.39 | DB2 40.29 | Reliability 40.29 |
| CSI 3 816 | Sensors 26.8 | Jboss Application Server 43.42 | Capability 75.72 |
| CSI 4 818 | Integration 30.57 | OSLC 41.57 | Reliability 41.57 |

FIG. 8

GENERATION OF TEST SCENARIOS BASED ON RISK ANALYSIS

BACKGROUND

The present disclosure relates to code testing, and more specifically, to the generation of code test scenarios based on risk analysis.

Computer software has changed and improved much over time. However, software is composed of code, and the code is often being changed, tweaked, or re-written. At least partially due to these factors, code in software is often prone to errors, mistakes, or bugs. Even a small change to code in software can therefore have a profound effect on the usability and functionality of the software. In order to reduce the likelihood that software will malfunction, the code can be tested to attempt to find these problems before the software is implemented. However, effective testing of code is challenging. The challenge of testing code is made more changing by the evolving nature of software programs.

SUMMARY

Embodiments of the present disclosure provide for a method, system, and computer program product for the generation of test scenarios based on risk analysis.

One embodiment is directed toward a method for generation of test scenarios based on risk analysis. The method includes receiving a first set of code test scenarios, the first set of code test scenarios configured to test one or more first code components, the first code components each including first code attributes. The method also includes determining a probability of finding defects in the first code components based on the first code attributes. The method also includes generating a second set of code test scenarios based on the determining the probability of finding defects in the first code components based on the first code attributes, where the second set of one or more test scenarios is configured to test one or more second code components based on the second code attributes. The determining the probability of finding defects in the first code components based on the first code attributes may determine whether the probability of finding defects meets a defects threshold. The defects threshold may be set at various levels, or may change based on circumstances, according to various embodiments.

Another embodiment is directed toward a system for generation of test scenarios based on risk analysis. The system includes one or more computer processor circuits that are configured to host a code testing application. The code testing application is configured to receive a first set of code test scenarios, the first set of code test scenarios configured to test one or more first code components, the first code components each including first code attributes. The code testing application is also configured to determine a probability of finding defects in the first code components based on the first code attributes. The code testing application is also configured to generate a second set of code test scenarios based on the determining the probability of finding defects in the first code components based on the first code attributes, wherein the second set of one or more test scenarios is configured to test one or more second code components based on the second code attributes.

Another embodiment is directed toward a computer program product for the generation of test scenarios based on risk analysis. The computer program product includes a computer readable storage device including a computer readable program. The computer readable program, when executed on a computer device, causes the computing device to receive a first set of code test scenarios, the first set of code test scenarios configured to test one or more first code components, the first code components each including first code attributes. The computer readable program, when executed on a computer device, also causes the computing device to determine a probability of finding defects in the first code components based on the first code attributes. The computer readable program, when executed on a computer device, also causes the computing device to generate a second set of code test scenarios based on the determining the probability of finding defects in the first code components based on the first code attributes, where the second set of one or more test scenarios is configured to test one or more second code components based on the second code attributes.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 8 depicts a table for code clustering, according to various embodiments.

Figure 1:
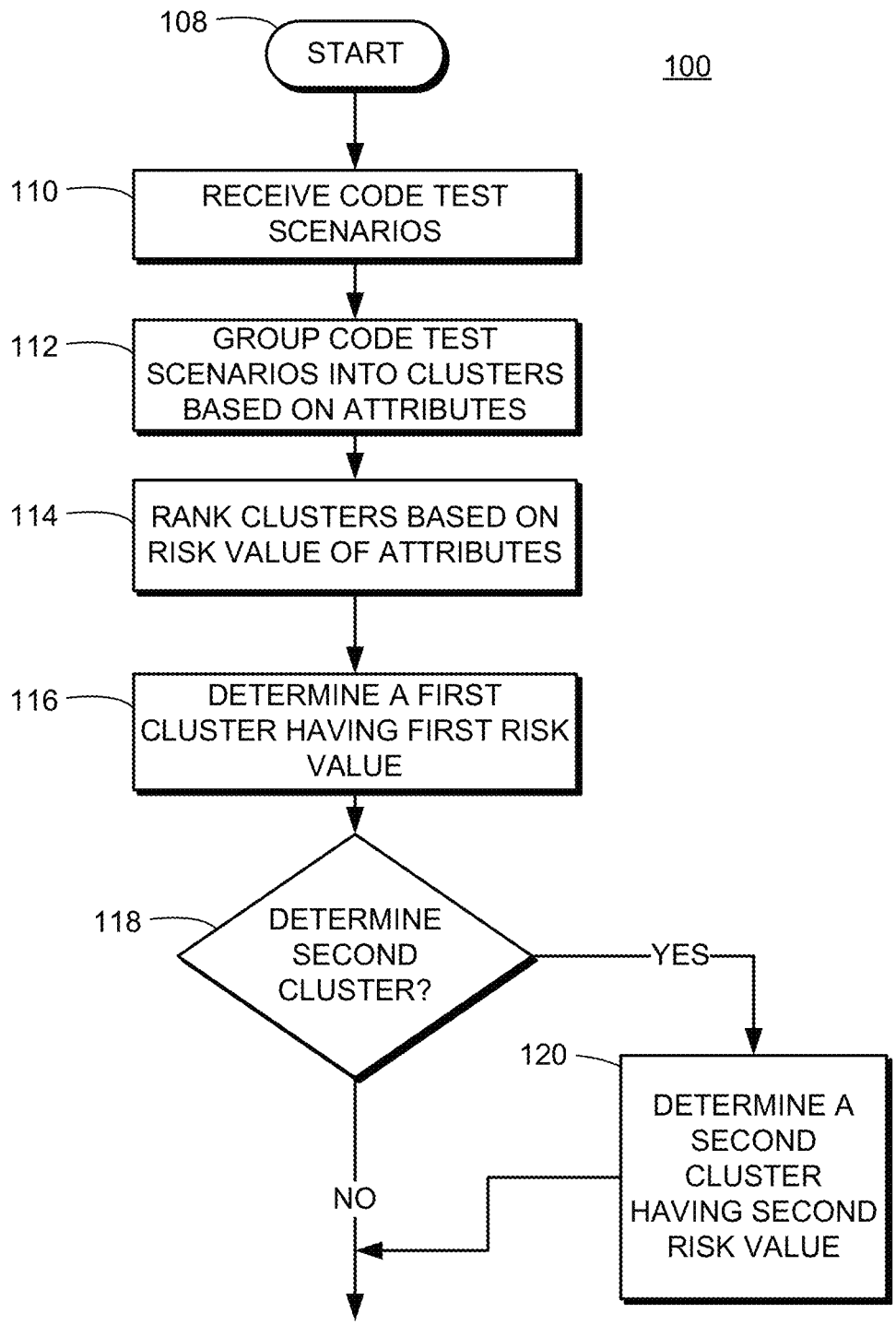
FIG. 1 depicts a flowchart of a first portion of a first example method of testing code, according to various embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to code testing, and more specifically, to the generation of code test scenarios based on risk analysis. While the present disclosure is not necessarily limited to such applications, various aspects of the disclosure may be appreciated through a discussion of various examples using this context.

Code in software often undergoes change. Changes in code often result in, or contribute to, errors in the code. By taking note of which specific code components are undergoing change in the software over time, it may be possible to focus code testing on code components that are most likely to have errors resulting from changes. Additionally, by utilizing a clustering method, the code components that have been changed can be clustered into related clusters based on factors. In so doing, clusters of code components that are most likely to have errors may be tested efficiently. Instead of repeating the same static code testing scenarios, a dynamic code testing scheme may include custom-made code testing scenarios, which may increase efficiency of code testing. Other features may be tested besides code, as described herein. However, code may be used herein for clarity, according to various embodiments.

According to embodiments, code may refer to the symbolic arrangement of statements or instructions in a computer program in which letters, digits, etc. are represented as binary numbers. Additionally, code may refer to the set of instructions in such a program. Code components may refer to specific constituent parts of code. According to embodiments, software is composed of code. Code components may include lines of code, according to various embodiments.

According to embodiments, code testing may refer to the process of testing, exercising and/or stressing software (including code) to verify that it satisfies specified requirements and to detect errors. The process of code testing may include analyzing software to detect the differences between existing and required conditions (e.g., bugs), and to evaluate the features of the code components. The process of code testing may further include operating a system or component under specified conditions, observing or recording the results, and making an evaluation of some aspect of the system or component.

According to embodiments, test scenarios may refer to specific instances in which code testing is applied to code. For example, certain code may be tested and certain code may not be tested. Alternatively, test scenarios may include a hierarchical order of code testing, where certain code is to be tested before other code, which may be in an order based on relative importance.

According to embodiments, code defects may refer to one or more problems that exist in code that either prevent the code from functioning properly, or cause the code to not function at all. Code defects may also include errors in the code that do not prevent the code from functioning properly, but are undesirable for other reasons.

According to embodiments, a test case step may refer to an iteration of one or more test scenarios. According to embodiments, multiple test case steps may be utilized to test code.

According to embodiments, current product quality may refer to code quality at a point in time. Current product quality may also refer to various qualities or characteristics of various code components. Current product quality may be the probability of the occurrence of errors in code at a point in time.

According to embodiments, a defects discovery ratio may refer to the relative effectiveness of code test scenarios for finding code defects.

According to embodiments, for test scenarios in a given repository, efficiency factors may be calculated for each test scenario. Each efficiency factor, or metric, may indicate whether it is worthwhile to execute a particular scenario at a given time. Based on the value of each efficiency factor, some scenarios may be delayed or excluded from execution.

According to embodiments, component-subcomponent impact (CSI) data may refer to component, subcomponent and orthogonal defect classification (ODC) impact fields defined in a repository, e.g., a code defect repository. According to various embodiments, a component may be, e.g., a sensor, a subcomponent may be a web application server (WAS) sensor ODC, and a corresponding impact may be a metric for performance analysis, according to various embodiments.

According to embodiments, clustering may refer to the grouping of various test scenarios according to various characteristics of the test scenarios. Clustering may be a data mining technique, such as machine learning, used to place data elements into related groups without advance knowledge of the group definitions. Various clustering techniques include k-mean clustering and expectation maximization (EM) clustering. Clustering may increase efficiency of code testing.

According to embodiments, in order to help optimize a software test process to execute as few test scenarios as possible and efficiently find a maximum number of code defects in software, existing test scenarios may be modified on-the-fly. The existing test scenarios may be modified on-the-fly to better fit current product quality of code. Test scenarios may be dynamically created or modified, depending on various factors, including the number of current defects, which or how many files were changed, and/or various other factors. These various other factors may be called "current product quality" factors, as described herein.

Test scenarios may be based on static prioritization. Static prioritization, usable for efficiency and simplicity of execution, may be calculated using data from existing or previous test scenarios, e.g., historical data and trends. In particular, some solutions for prioritization of test scenarios may generally use a static calculation to determine which test scenarios are the most likely to have problems, and therefore to need testing. One drawback of such solutions is that the same test scenarios may often be executed repeatedly for essentially the same code. This repetition may lead to inefficiencies, including inefficient discovery of defects. The efficiency of the discovery of defects is sometimes called a "defects discovery ratio." In short, some methods for test scenarios may use static artifacts, which though simple to implement, are also prone to quickly become outdated or redundant.

One advantage of some embodiments may be the generation of efficient test scenarios, which may cover product features with a high probability of finding hidden defects. One presented approach may allow one to utilize machine resources in an efficient way, since changed areas (from a previous software build) are being tested. This disclosure, according to various embodiments, may address the "paradox of the pesticides," a frequent problem in software testing where too many non-problematic sections of software are tested in the process of finding the problem areas.

This disclosure addresses this problem by building test scenarios dynamically from individual bricks (e.g., test case steps), and taking advantage of randomization and variation, according to various embodiments. In some cases, test scenarios may also be removed from execution. The remaining test scenarios may then be executed according to priority, e.g., by executing highest priority first. By executing test scenarios in this way, efficiency of code testing may be improved accordingly.

Test scenarios may be generated dynamically using test case steps and machine repositories based on current product quality. A test scenario may be created specifically from various test case steps and machines that maximize the probability of finding code defects. As a result, in some embodiments, test scenarios may efficiently address current quality issues and may be able to dynamically adapt to changes in product quality. Thus, existence of out-of-date test scenarios in the repository may be reduced. As a result, unnecessary testing of test scenarios unlikely to be problematic to code may be reduced.

According to various embodiments, code defects may be defined in an authorized program analysis report (APAR). Additionally, code defects may be addressed in test case steps, where a machine contains attributes of code, e.g., CSI fields. According to various embodiments, CSI fields may include ODC.

According to various embodiments, each code attribute, or CSI, may contain a list of attributes/features assigned to it, which may include components of the test cases. Various examples of categories contained in a CSI may include: the number of defects, the number of changed code lines, the number of test cases, the number of test points covered, the number of failed/passed test points, the number of APARs/performance management recognition systems (PMRSs), the number of change set owners, etc. According to various embodiments, some or all CSIs may be clustered using a hierarchical clustering algorithm, as described herein.

According to various embodiments, a machine, such as a computer, configured to cluster CSIs, may select a level containing the number of clusters (k) closest to where $k \approx \sqrt{(n/2)}$ (e.g., for n=2000, use k=31 clusters), in order to determine a cluster number. According to various embodiments, the "elbow" method can be used here as well, which looks at the percentage of variance explained as a function of the number of clusters. According to various embodiments, the mean risk value for each cluster (starting from level 1 to n−1) may be calculated. According to various embodiments, the top risk clusters (the ones with highest risk) may be selected. According to various embodiments, a selected cluster may contain a chain of CSIs. Each CSI represents a feature and/or functionality.

According to various embodiments, attributes need not be selected and thresholds need not be provided. Instead, clustering algorithms and prioritization schemas may function automatically. One embodiments may take as an input various available attributes, but may not analyze each of them separately, but instead as a set, which may take advantage of possible correlation between them. This may be beneficial as it may be difficult to provide ideal thresholds and manually determine which of attributes are more or less significant. By utilizing clustering, various problems may be reduced by grouping similar components in one cluster, according to attributes. By utilizing a single test scenario for a particular cluster we may achieve improved coverage and risk minimization than running larger set of test scenarios, according to various embodiments.

In some embodiments, described approaches may also minimize manual maintenance cost needed to review automated tests results. Manual maintenance cost may be minimized by building scenarios crucial to and dedicated to a particular software build. This approach, in effect, changes a test scenario from a static artifact (which may be written and saved in test repository and executed over and over) to test scenarios created dynamically based on the latest software build changes to the current code.

The solutions described in this disclosure can be adopted as a part of various test management products, according to various embodiments. As an alternative embodiment to various clustering methods described herein, a risk formula, such as linear combination of attributes/features, can be used to select top priority code (e.g., CSIs) for further test scenario transformation.

Automated test scenarios may contain CSI definitions assigned to each test case (a scenario may include test cases and machines). Test cases may include steps, according to various embodiments.

An example test case:

```
<testcase id="WAS_discovery" csi="Sensors, WAS, Capability">
    <step id="ControlDiscovery"
        machine="${DiscoveryWorkerHost}" isNegative="false"
        isAssert="false"><param value="start"
        name="param.action"/><param
        value="sensors.WebSphereSensor"
        name="param.scopeName"/><param
        value="sensors.WebSphereDeep"
        name="param.profileName"/><param
        value="regular" name="param.run
        name"/></step>
    </step>
<testcase/>
```

In the case of a described product/automation framework, scenarios may be kept in the form of extensible mark-up language (XML) files. However, this approach can be applied to any other form, for example, rational quality manager (RQM) test case definition. As a result, the test cases repository may be built with mapping to one or more particular CSI. The general assignment of steps (e.g., one level lower than test case steps) to particular CSI can also be made. For example, CSI definitions can be added to steps, according to various embodiments. As a result, there may exist a relationship between steps and other data through CSI data. Steps may also have order value assigned to make sure that each of a particular set of steps, e.g., the installation step, will be added to a new test scenario before configuration.

Consistent with various embodiments, a test scenario may be created by parsing an existing repository of simple scenarios and moving matching test cases to new test scenarios, which may be created for a single run. If steps have assigned CSI values, the test scenario can be also created on lower level by grabbing matching steps, instead of test cases. Maintenance cost reduction and test result wait time can be estimated, as described herein.

FIG. 1 depicts a flowchart of a first portion of a first example method 100 of testing code, according to various embodiments.

The method may start at operation 108 and may receive code test scenarios at operation 110. Received code test scenarios may exist prior to a code test process, according to various embodiments. Received code test scenarios may be a static list of code test scenarios as a starting point, and the received code test scenarios may be subsequently modified if it is found that the received code test scenarios are not optimal or most efficient for testing the code in question. Received code test scenarios may be received as a set of code test scenarios, according to various embodiments. Received sets of code test scenarios may include a first set, a second set, etc.

According to various embodiments, a received set of code test scenarios may be formed by identifying code components, or attributes thereof, that have been altered or changed since a first set was received. The received set may also be formed by assessing the identified altered code components using a risk formula. According to various embodiments, a received set of code test scenarios may be formed by determining which test scenarios are likely to find defects in the identified code components, the determined test scenarios forming a second set of the one or more test scenarios. According to various embodiments, a received set of code test scenarios may be formed by grouping one or more code test scenarios into one or more clusters based on attributes of the one or more code components. According to various embodiments, a received set of code test scenarios may be formed by ranking the one or more clusters in terms of risk based on the code components of the test scenarios in the one or more clusters. According to various embodiments, a received set of code test scenarios may be formed by determining that a first cluster of the one or more clusters has a first risk value.

At operation 112, the code test scenarios may be grouped into clusters based on code components. Code components that include component-subcomponents impact (CSI) data may be clustered according to this data. Clustering may be accomplished according to various methods, as described herein. According to various embodiments, code components may be treated as clusters and analyzed in a similar fashion, as described herein.

At operation 114, the clusters may be ranked based on risk value of code components. After clusters have been formed at operation 112, the clusters may be evaluated based on risk values. The evaluation may focus on identifying which clusters are at the highest risk of containing errors in the code contained within. Risk values may be assigned to various code components according to various methods.

At operation 116, a first cluster having a first risk value may be determined. Following ranking the clusters in operation 114, a cluster having a first risk value may be determined or identified. According to various embodiments, a first risk value may be a relatively high or relatively low risk value. According to various embodiments, a first risk value may be a highest or lowest relative risk value.

At operation 118, it may be decided whether to it is desired to determine a second cluster to be tested. The second cluster may have a second risk value, according to various embodiments. The determination of a second cluster may be determined by various methods, which may include reading various code components contained in the first or other cluster. The decision whether to determine a second cluster may also be pre-determined, according to various embodiments. If a second cluster is desired to be determined at operation 118, then a second cluster having a second risk value may be determined at operation 120. The flowchart may then proceed to operation 210 of FIG. 2. If a second cluster is not desired to be determined at operation 118, the flowchart may proceed directly to operation 210 of FIG. 2.

Figure 2:
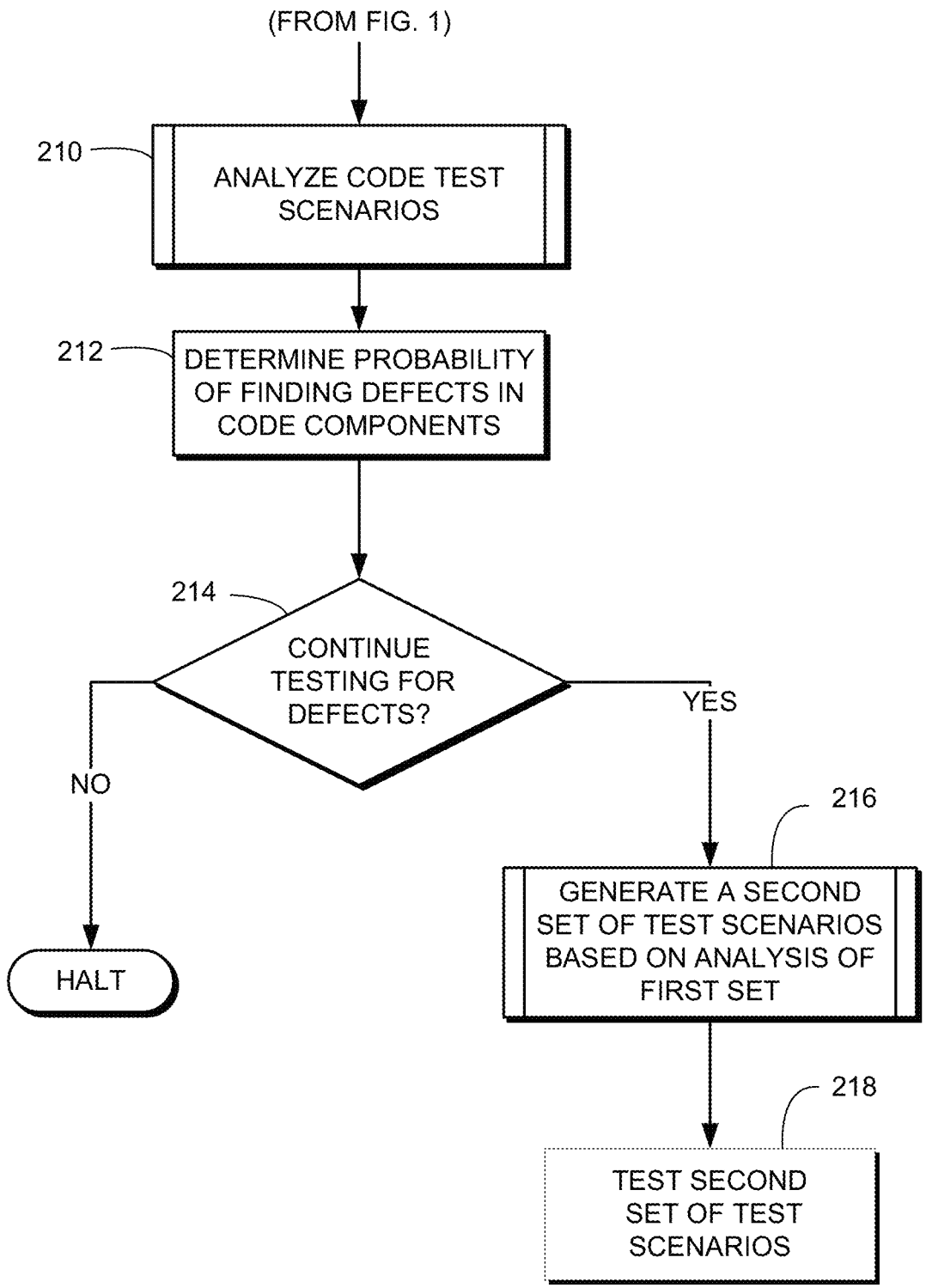
FIG. 2 depicts a flowchart of a second portion of the first example method of testing code, according to various embodiments.

FIG. 2 depicts a flowchart of a second portion of the first example method 100 of testing code, according to various embodiments. FIG. 2 may continue the method of FIG. 1, according to various embodiments.

At operation 210, code test scenarios may be analyzed. Various embodiments of operation 210 are described in greater detail in FIG. 3. Proceeding to operation 212, the probability of finding defects in code components may be determined by various code-testing machines or computers configured to test code in software. Various methods may be used to determine the probability of finding defects in code components, as described herein. The probability of finding defects in code components may be stored in various repositories, according to various embodiments.

At operation 214, a code-testing computer may determine whether it is desired to continue testing for defects based on the second set of test scenarios. If it is not desired to continue testing for defects based on the second set of test scenarios, the process may halt. If it is desired to continue testing for defects based on the second set of test scenarios, a second set of test scenarios may be generated, at operation 216, based on the analysis of the first set of code components. Various embodiments of operation 216 are described herein in greater detail. The second set of test scenarios may be tested at operation 218. Aspects of operation 218 may be similar to operations 110-120 of FIG. 1 and 210-214 of FIG. 2. Operation 218 may include receiving data based on the first set of code test scenarios, including the clusters of code test scenarios, how many errors or defects were found, etc.

Figure 3:
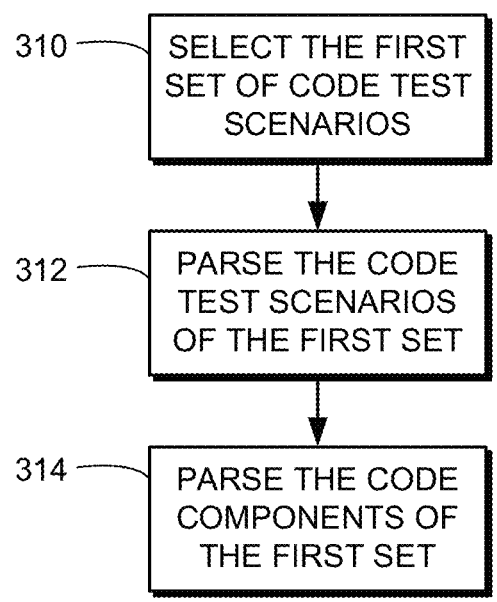
FIG. 3 depicts a flowchart of an example method of analyzing a first set of code test scenarios, according to various embodiments.

FIG. 3 depicts a flowchart of an example method 300 of analyzing a first set of code test scenarios, according to various embodiments.

FIG. 3 depicts operation 210 of FIG. 2 in greater detail, according to various embodiments. At operation 310, the first set of code test scenarios is selected, according to various embodiments. Operation 310 may follow or precede various operations, according to various embodiments.

At operation 312, the code test scenarios of the selected first set are parsed. Parsing the first set of code test scenarios may include breaking down the first set of code test scenarios into constituent components. According to various embodiments, the constituent components may include what the code test scenario is testing, where it is being tested, when it is being tested, how it is being tested, etc. After the constituent components have been broken down, the constituent components may be analyzed by various methods.

At operation 314, the code components, such as attributes, of the first set are parsed. Parsing the code components may take various forms. The code components may be further broken down and categorized, according to various metrics. The code components may be analyzed according to various methods. Operation 314 may proceed to operation 212 of FIG. 2, according to various embodiments.

Figure 4:
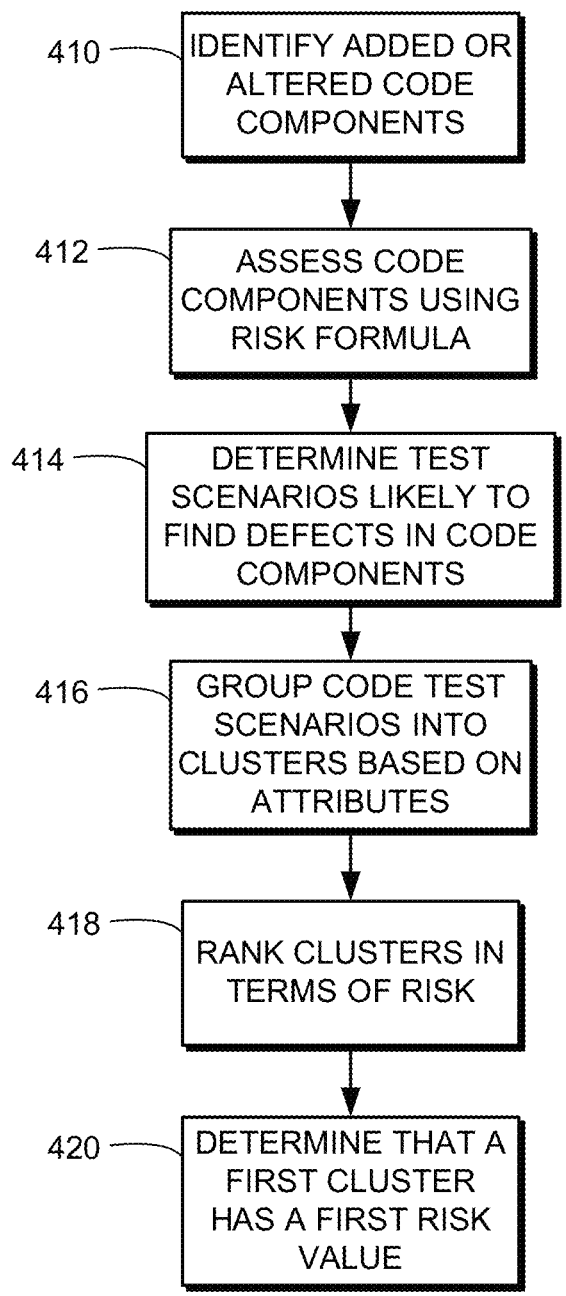
FIG. 4 depicts another flowchart of an example method for generating a second set of test scenarios based on analysis of a first set of test scenarios, according to various embodiments.

FIG. 4 depicts another flowchart of an example method 400 for generating a second set of test scenarios based on analysis of a first set of test scenarios, according to various embodiments.

FIG. 4 depicts operation 216 of FIG. 2 in greater detail, according to various embodiments. At operation 410, added or altered code components, or attributes thereof, are identified. Identifying code components that have been added or altered since a previous code test scenario may occur by various methods. A comparison may be made between previous and current code components, or a log may track changes to code components, according to various embodiments. Operation 410 may follow or precedes various operations, according to various embodiments.

At operation 412, code components may be assessed using a risk formula. The risk formula may include assessing the code components based on various factors related to risk of errors occurring in the code components. At operation 414, test scenarios likely to find defects in code components are determined. The determination of test scenarios likely to find defects in the code components may use the assessment of the code components of operation 412 to infer which test scenarios are most likely to find code components that are at the highest risk of containing errors.

At operation 416, code test scenarios are grouped into clusters based on various code test attributes. Clustering code test scenarios based on code test attributes may include grouping code test scenarios based on current and previous CSI data, as described herein.

At operation 418, clusters are ranked in terms of risk. As described herein, once the code test scenarios are clustered, the clusters of code test scenarios may be ranked into a hierarchy. One possible rank order of clusters may include a list from highest probability of a cluster containing test scenarios likely to find errors or defects in code to lowest probability of a cluster containing test scenarios likely to find errors or defects. Aspects of operation 418 may be similar to aspects of operation 114 of FIG. 1.

At operation 420, it may be determined that a first cluster has a first risk value. The first cluster having a first risk value may represent the cluster having a high or a low risk value. According to various embodiments, the first cluster may have a relatively highest or lowest risk value, when compared to other clusters. Operation 420 may proceed to operation 218 of FIG. 2, according to various embodiments.

Figure 5:
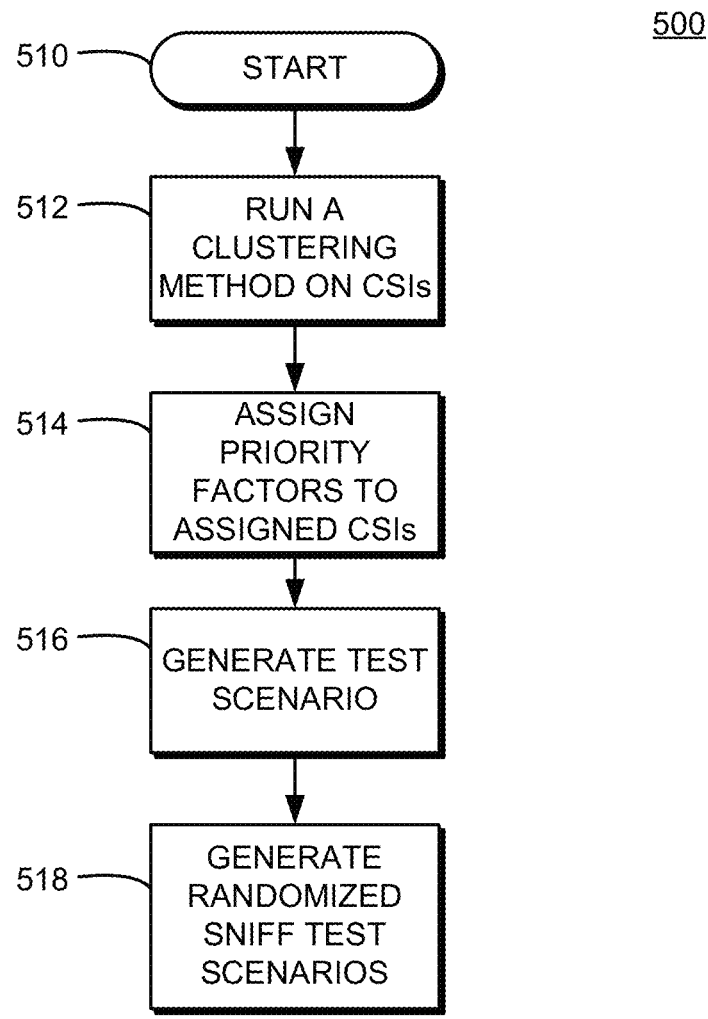
FIG. 5 depicts another flowchart of an example method for using code attributes to generate code testing scenarios, according to various embodiments.

FIG. 5 depicts another flowchart of an example method 500 for using CSIs to generate code testing scenarios, according to various embodiments. Method 500 may precede or follow various operations, as described herein.

At operation 510, a process may start with various CSIs. The CSIs may be at a clustering level of zero, and may therefore be not be clustered. A set of test scenarios may then be created according to the following operations, according to various embodiments.

At operation 512, a clustering method, such as a k-mean or hierarchical clustering method, may be run against some or all CSIs set with filled attributes or features. For example, an estimated number of clusters/groups for a set of 2000 CSIs would be about 31 using the general rule described herein. At operation 514, priority factors may be assigned to the clusters that have been created. According to various embodiments, priority factors may be defined as the number of PMRSs reported to particular CSI in cluster. According to various embodiments, CSI expert knowledge may also be employed. Expert knowledge may be implemented as a knowledge base stored in a "config" file that increases or decreases the priority. For example, based on test experience it may be known that WAS discovery is currently likely. Various feature defects may be easily fixed, so thus allowing for a greater tolerance of risk of errors.

At operation 516 a full test scenario may be generated for a top priority cluster. Code test scenarios may be randomized prior to the receiving the code test scenarios, according to various embodiments. A top priority cluster may be determine according to methods, as described herein. At operation 518, a computer may generate "sniff" test scenarios for the rest of clusters. The sniff test scenarios may include a relatively small number of CSIs selected either randomly or basing on defined metric: for example priority. The "small number" of CSIs, e.g., 3, may depend on a machine's capacity for execution. For example, from an example set of 2000 test scenarios, various test scenarios may be selected. For example, 30*3 (90 CSIs)+1 cluster (100, if a cluster contains about 100 CSIs), yielding a total number of test scenarios to be tested at about 190 of 2000 total possibilities.

Particular embodiments of implementation of the methods described herein may be an extension of ODC field by component-subcomponent fields. Deployment of triples (e.g., a product map including possible test paths) to rational team concert (RTC) defects/APARs/test cases/tasks may occur. Extension of automated framework to support such fields in automated steps/test cases may occur, according to various embodiments. A full map of triples may be built, as described herein, (product map consisting of possible test paths). A second part design may have already been created (second part covers: clustering of map, top priority clusters selection, transforming clusters to automated test scenarios, etc.). Based on current automation maintenance cost and number of CSIs selected by risk formula we may achieve a substantial cost reduction by running tests correlated with changed areas of code, e.g., on fewer than 200 CSI of 2000 CSI possible.

Figure 6:
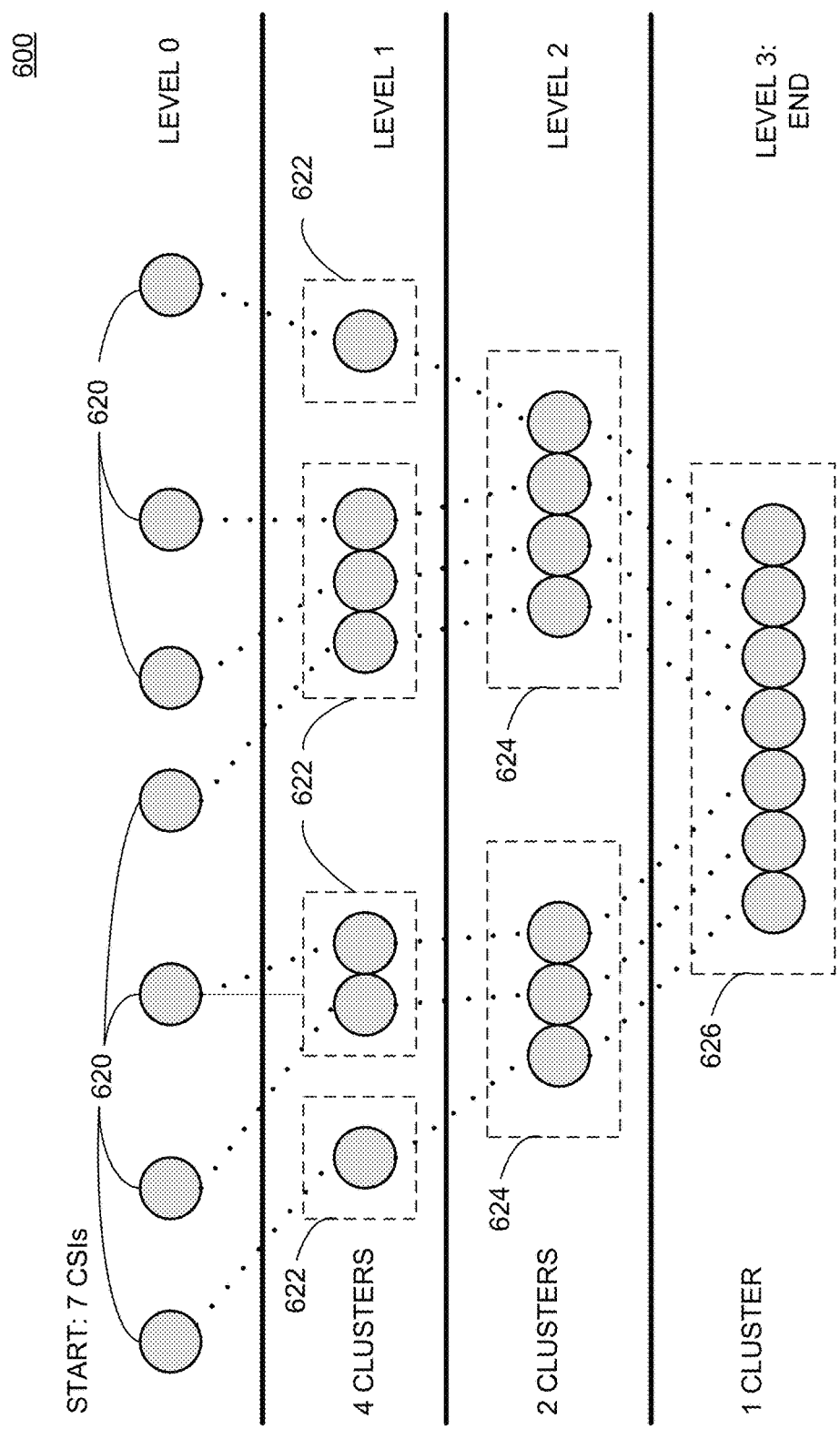
FIG. 6 depicts a visualization of clustering, according to various embodiments.

FIG. 6 depicts a visualization of clustering, according to various embodiments.

Clustering of code components or code test scenarios may be employed to increase efficiency of code testing, according to various embodiments. For example, various CSIs may be clustered in order for more efficient code testing using code test scenarios. The visualization 600 may start with an example seven CSIs 620 at level 0. Dotted lines connect the seven CSIs 620 from the starting state to the clustered state at level 1. Level 1, as shown, contains four clusters 622. The four clusters formed from the seven CSIs 620 may be formed by analyzing attributes, properties, data, or metadata found in the seven CSIs 620 and clustering the seven CSIs 620 based on the attributes, etc. Generally, clusters 622 may be formed according to which CSIs 620 are most similar or likely to be tested in groups efficiently.

Proceeding to level 2, the four clusters 622 may be further clustered into two clusters 624. The two clusters 624 may be formed based on the attributes, etc. of the four clusters 622 and the CSIs within each cluster. The clustering may end at level 3, where all the example CSIs are clustered into one cluster 626. Clustering may include one or more levels. The levels may include level 1, level 2, or level 3, according to various embodiments. The levels may include more or fewer levels, according to various embodiments. Generally, the CSIs 620 will be clustered into fewer clusters as the number of levels of clustering increases. According to various embodiments, it may be desirable to have a greater or fewer number of clusters to analyze.

Figure 7:
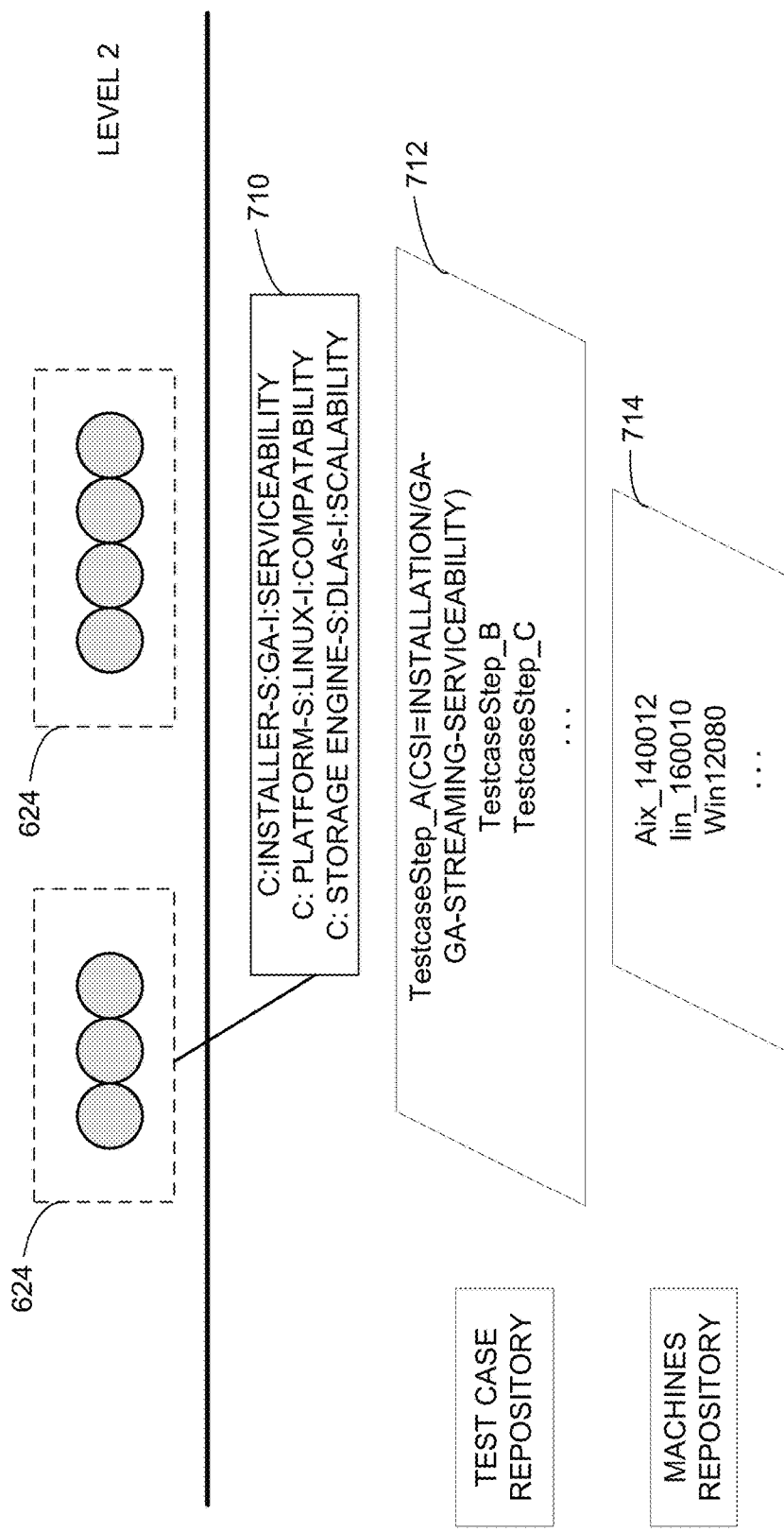
FIG. 7 depicts an example of a test case step after clustering, according to various embodiments.

FIG. 7 depicts an example of a test case step after clustering, according to various embodiments.

Clusters 624 may contain CSIs in two repositories: machines and test case steps.

Test scenario may then be built, e.g., by the following steps:
  automatically_generated_scenario:
    1. stepA
    2. stepD
    3. stepN
    +lin_160010

At 710, the CSI values for a test case step are shown, including C:INSTALLER-S:GA-I:SERVICEABILITY, C:PLATFORM-S:LINUX-I:COMPATABILITY, and C:STORAGE ENGINE-S:DLAs-I:SCALABILITY. By analyzing CSI values assigned to various steps, it may be determined which steps may be required to cover corresponding parts of various code or features. In a scenario build process, steps and machines having the same CSI values as pulled out from the repository may be create a scenario, according to various embodiments.

A test case repository is represented at 712, including TestcaseStep_A, corresponding to 710, as well as TestcaseStep_B, and TestcaseStep_C, which may be other CSI values, according to various embodiments.

A machine repository is represented at 714, including various machine-readable data, as shown.

FIG. 8 depicts a table 800 for code clustering, according to various embodiments.

The table 800 in an example scenario, contains rows for CSI 1 812, CSI 2 814, CSI 3 816, and CSI 4 818. Each CSI represented in the table 800 contains columns, which represent components 820, subcomponents 822, and impact 824, according to the shown embodiments. For example, table 800 contains test cases mapped to CSI 1 812=(model, simplified, serviceability), and CSI 2 814=(database migration, db2, reliability). Various CSIs may be clustered, for example into cluster 810. In the represented embodiment, CSI 1 812 and CSI 2 814 are shown clustered into one cluster 810. Clustering, as described herein, make take into account the data for components, subcomponents, and/or impact of various CSIs. According to various embodiments, CSI 1 812 may contain component 820 of Model 64.22, subcomponent 822 of Simplified 100.0, and impact 824 of Serviceability 100.0. Model 64.22 means that the component of the CSI 1 has a risk score of 64.22 (out of 100) based on its model type, according to various embodiments. Simplified 100.0 means that the component of the CSI 1 has a risk score of 100 (out of 100) based on its model type, according to various embodiments. Serviceability 100.0 means that the component of the CSI 1 has a risk score of 100 (out of 100) based on its model type, according to various embodiments. According to various embodiments, CSI 2 814 may contain components 820 32.39, subcomponent 822 DB2 40.29, and impact 824 of reliability 41.57.

Based on analyzing, comparing, and dissecting the various CSIs found in table 800, cluster 810 may be formed. Clustering may be used to group CSIs associated with test scenarios, according to various embodiments. Cluster 810 may be formed by a process similar to operation 112 of FIG. 1, among others, according to various embodiments.

Figure 9:
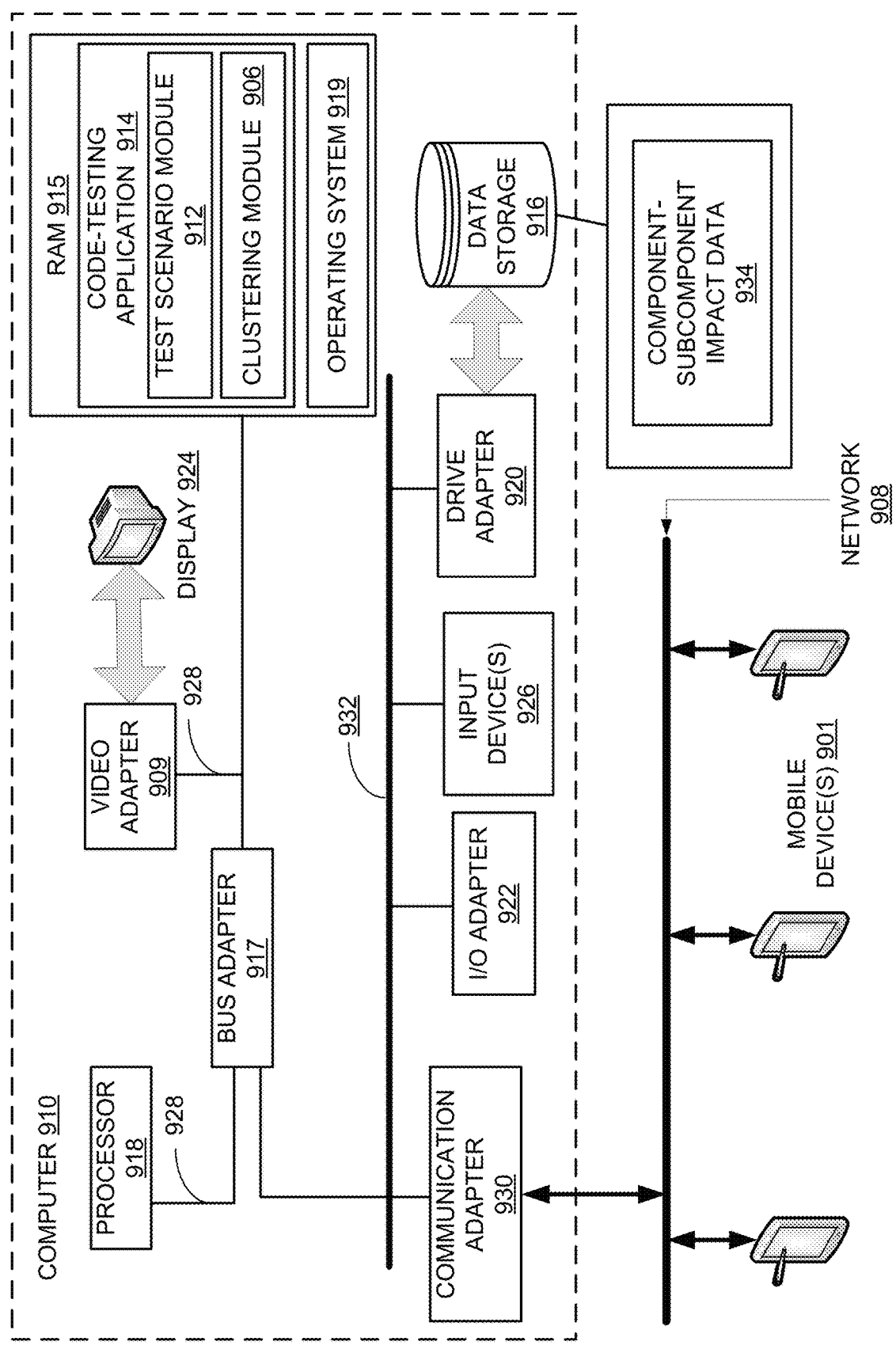
FIG. 9 depicts a block diagram of automated computing machinery, according to various embodiments.

FIG. 9 depicts a block diagram of automated computing machinery, according to various embodiments.

The automated computing machinery may represent a code-testing machine, among others, according to various embodiments. The example computing machinery may include a computer 910 useful in performing aspects of the disclosure, according to various embodiments. The computer 910 of FIG. 9 includes at least one computer processor 918 or central processing unit (CPU) as well as random access memory 915 (RAM) which is connected through bus adapter 917 to processor 918 and to other components of the computer 910. The computing machinery or the processor 918 may include one or more computer processing circuits.

The RAM 915 may include a code-testing application 914. The code-testing application 914 may access or control various functions of the computer's RAM 915, according to various embodiments. The code-testing application's instructions and component-subcomponent impact data 934 may be stored to or read from data storage 916, which may be a hard disk drive, according to various embodiments. The memory controller's communications may be received from various modules located in the RAM 915.

The RAM 915 may include a test scenario module 912. The test scenario module's instructions may be populated into the data storage 916. The code-testing application 914 may control when to test code. The code-testing application 914 may access a clustering module 906 and a test scenario module 912, according to various embodiments. The clustering module 906 may control clustering of various code and/or test scenarios, according to various embodiments. The test scenario module 912 may control various processes associated with the creation, management, and/or analysis of test scenarios, according to various embodiments. The clustering module 906 and the test scenario module 912 may be stored in data storage 916, according to various embodiments. Additional modules may be included in the code-testing application 914, according to various embodiments.

The RAM 915 may include an operating system 919. Operating systems useful for record filtering according to embodiments of the present disclosure include UNIX®, Linux®, Microsoft XP™, AIX®, IBM's i5/OS™, and others. The operating system 919 is shown in RAM 915, but many components of such software typically are stored in non-volatile memory also, such as, for example, on a disk drive 916.

The computer 910 may also include disk drive adapter 920 coupled through expansion bus 932 and bus adapter 917 to processor 918 and other components of the computer 910. Disk drive adapter 920 connects non-volatile data storage to the computer 910 in the form of disk drive (data storage) 916. Disk drive adapters useful in computers include Integrated Drive Electronics (IDE) adapters, Small Computer System Interface (SCSI) adapters, Serial AT Attachment (SATA), and others. Non-volatile computer memory also may be implemented for as an optical disc drive, electrically erasable programmable read-only memory (so-called 'EEPROM' or 'Flash' memory), RAM drives, etc.

The data storage 916 may include one or more storage devices in a tiered or non-tiered configuration. The data storage 916 may include various component-subcomponent impact data 934, clustering data, binary code, and/or test scenario data that are received by the application and stored for later use by the code-testing application 914 through RAM 915.

The example computer 900 may include one or more input/output (I/O) adapters 922. I/O adapters implement user-oriented input/output through, for example, software drivers and computer hardware for controlling output to display devices such as computer display screens 924, as well as user input from one or more user input devices 926 such as keyboards, mice, styli, or touchscreens, according to various embodiments. The example computer 910 may include a video adapter at 909, which is an example of an I/O adapter specially designed for graphic output to a display device 924 such as a display screen or computer monitor. The video adapter (I/O) would be connected to processor 918 through a bus adapter 917, and the front side bus 928, which is also a high-speed bus.

The example computer 910 includes a communications adapter 930 for data communications with other computers, for example, mobile device(s) 901, and for data communications with a data communications network 908. Such data communications may be carried out serially through RS-232 connections, through external buses such as a Universal Serial Bus (USB), through data communications networks such as IP data communications networks, and in other ways as will occur to those of skill in the art. Communications adapters implement the hardware level of data communications through which one computer sends data communications to another computer, directly or through a data communications network 908. Examples of communications adapters include modems for wired dial-up communications, Ethernet (IEEE 802.3) adapters for wired data communications network communications, and IEEE 802.77 adapters for wireless data communications network communications.

The descriptions of the various embodiments of the present disclosure have been presented for purposes of illustration, but are not intended to be exhaustive or limited to the embodiments disclosed. Many modifications and variations will be apparent to those of skill in the art without departing from the scope and spirit of the described embodiments. The terminology used herein was chosen to best explain the principles of the embodiments, the practical application or technical improvement over technologies found in the marketplace, or to enable others of skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method, comprising:
   receiving a first set of code test scenarios, the first set of code test scenarios configured to test one or more first code components, the one or more first code components each including first code attributes, wherein the first code attributes include component-subcomponent impact (CSI) data;
   grouping the first set of code test scenarios into one or more clusters based on the first code components;
   assigning a priority factor to each of the one or more clusters, wherein a first cluster from the one or more clusters has a highest priority factor;
   determining, for each code test scenario in the first set of code test scenarios, a probability of finding defects in the one or more first code components based on the first code attributes;
   identifying, based on the probabilities, code test scenarios in the first set of code test scenarios that are likely to find the defects; and
   generating a second set of code test scenarios, wherein the second set of code test scenarios includes only the identified code test scenarios, and wherein the second set of code test scenarios is configured to test all CSI data for the first cluster and a portion of CSI data selected for a next cluster from the one or more clusters.

2. The method of claim 1, further comprising:
   ranking the one or more clusters into a hierarchy in terms of risk value, based on the one or more first code components of the first set of code test scenarios in the one or more clusters, wherein the risk value is a calculated probability of finding defects in the one or more first code components; and
   determining that a first cluster of the one or more clusters has a first risk value.

3. The method of claim 1, wherein the one or more clusters is a number of clusters substantially equal to the square root of half the number of the received first set of code test scenarios.

4. The method of claim 1, wherein grouping the first set of code test scenarios into one or more clusters includes matching code components by sorting and associating the code components according to the first code attributes.

5. The method of claim 4, wherein the code components are matched based on commonalities.

6. The method of claim 1, wherein the CSI data comprises a component type, a subcomponent type, and an impact type.

7. The method of claim 6, wherein the impact type comprises at least one of serviceability, reliability, compatibility, scalability, and capability.

8. The method of claim 1, wherein the first code attributes are selected from the group consisting of: number of code defects, number of changed code lines, number of test cases, number of test points covered, number of failed test points, number of passed test points, number of authorized program analysis reports, and number of change set owners.

9. The method of claim 1, wherein the first set of code test scenarios are randomized prior to the receiving the first set of code test scenarios.

10. The method of claim 1, wherein determining the probability of finding defects in the one or more first code components based on the first code attributes includes using a risk formula.

11. A system comprising:
    at least one memory component; and
    one or more computer processor circuits that are configured to host a code testing application, the code testing application configured to:
        receive a first set of code test scenarios, the first set of code test scenarios configured to test one or more first code components, the one or more first code components each including first code attributes, wherein the first code attributes include component-subcomponent impact (CSI) data;
        group the first set of code test scenarios into one or more clusters based on the first code components;
        assign a priority factor to each of the one or more clusters, wherein a first cluster from the one or more clusters has a highest priority factor;
        determine, for each code test scenario in the first set of code test scenarios, a probability of finding defects in the one or more first code components based on the first code attributes;
        identify, based on the probabilities, code test scenarios in the first set of code test scenarios that are likely to find the defects; and
        generate a second set of code test scenarios, wherein the second set of code test scenarios includes only the identified code test scenarios, and wherein the second set of code test scenarios is configured to test all CSI data for the first cluster and a portion of CSI data selected for a next cluster from the one or more clusters.

12. The system of claim 11, wherein the first code attributes are selected from the group consisting of: number of code defects, number of changed code lines, number of test cases, number of test points covered, number of failed test points, number of passed test points, number of authorized program analysis reports, and number of change set owners.

13. The system of claim 11, wherein the code testing application is further configured to:
    rank the one or more clusters into a hierarchy in terms of risk value, wherein the risk value is a calculated probability of finding defects in the one or more first code components; and
    determine that a first cluster of the one or more clusters has a first risk value.

14. The system of claim 13, wherein grouping the first set of code test scenarios into one or more clusters includes matching code components by sorting and associating the code components according to the first code attributes.

15. The system of claim 11, wherein the first code scenarios are randomized prior to the receiving the first set of code test scenarios.

16. The system of claim 11, wherein determining the probability of finding defects in the first code component based on the first code attributes includes using a risk formula.

17. A computer program product for code testing, comprising a computer readable storage medium having a computer readable program stored therein, wherein the computer readable program, when executed on a computer device, causes the computing device to perform a method comprising:

receiving a first set of code test scenarios, wherein the first set of code test scenarios is configured to test one or more first code components, the one or more first code components each including first code attributes, wherein the first code attributes include component-subcomponent (CSI) data;

grouping the first set of code test scenarios into one or more clusters based on the first code components;

assigning a priority factor to each of the one or more clusters, wherein a first cluster from the one or more clusters has a highest priority factor;

determining, for each code test scenario in the first set of code test scenarios, a probability of finding defects in the one or more first code components based on the first code attributes;

identifying, based on the probabilities, code test scenarios in the first set of code test scenarios that are likely to find the defects, and generating a second set of code test scenarios, wherein the second set of code test scenarios includes only the identified code test scenarios, and wherein the second set of code test scenarios is configured to test all CSI data for the first cluster and a portion of CSI data selected for a next cluster from the one or more clusters.

18. The computer program product of claim 17, wherein generating the second set of code test scenarios includes assessing the second code components based on corresponding code attributes to determine that the probability of finding defects in the second code components is at a maximum relative probability.

* * * * *